(No Model.)
J. DE CAUTERAC.
Vehicle.
No. 243,225. Patented June 21, 1881.
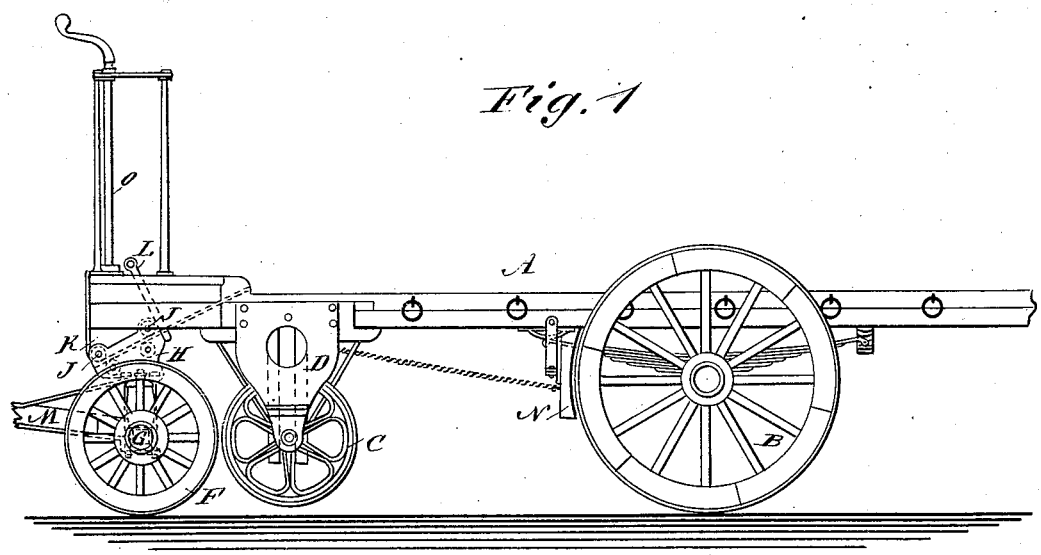
Fig. 1
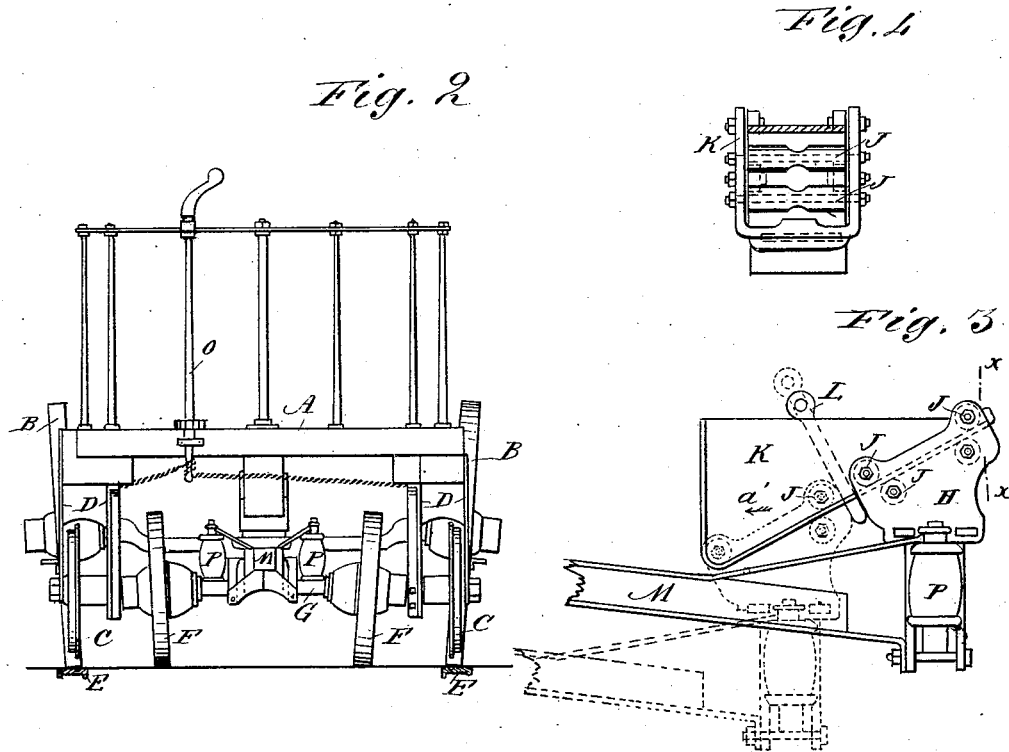
Fig. 2
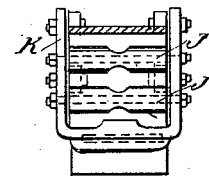
Fig. 4
Fig. 3
WITNESSES:
C. Neveux
E. Sedgwick
INVENTOR:
J. de Cauterac
BY Munn & Co.
ATTORNEYS.

UNITED STATES PATENT OFFICE.

JOSÉ DE CAUTERAC, OF MADRID, SPAIN.

VEHICLE.

SPECIFICATION forming part of Letters Patent No. 243,225, dated June 21, 1881.

Application filed April 22, 1881. (No model.) Patented in Spain July 30, 1880.

*To all whom it may concern:*

Be it known that I, JOSÉ DE CAUTERAC, of Madrid, Spain, have invented a new and useful Improvement in Vehicles, of which the following is a specification.

Heretofore vehicles have been constructed either with ordinary wheels only or with flanged or car wheels only, and with this construction it is very difficult for a vehicle with ordinary wheels to run on or from a track, and likewise it is very difficult to run a vehicle with flanged or car wheels from a track, in case an impediment or obstruction on the track is to be avoided, without damaging the wheels or the entire vehicle.

The object of my invention is to provide a vehicle which is equally well adapted to run on an ordinary road or on rails.

The invention consists in a vehicle provided in the rear with ordinary wagon-wheels and in front with a pair of fixed flanged wheels, and with a pair of ordinary wagon-wheels mounted on a common axle, provided with an inclined plane resting on the top of the same, and supporting an inverse-inclined plane fastened to the under side of the vehicle, so that when a locking-pin is withdrawn and the horses pull the inclined plane the axle will be drawn forward and the vehicle-frame will be raised, the flanged wheels being also raised, so that the front of the vehicle will be supported by the adjustable ordinary wagon-wheels.

In the accompanying drawings, Figure 1 is a side elevation of a vehicle provided with my improvement. Fig. 2 is a front elevation of the same. Fig. 3 is a detail side elevation of the inclined planes. Fig. 4 is a cross-sectional elevation of the upper inclined plane on the line *x x*, Fig. 3.

Similar letters of reference indicate corresponding parts.

The rear part of the vehicle is supported by a pair of ordinary wagon-wheels, B, and the front part is supported by a pair of flanged or car wheels, C, mounted on short pintles of frames D attached to the vehicle. The rear wheels, B, and the front wheels, C, have precisely the same gage, so that the rear wheels will rest on the rails E with the front wheel, C. Two ordinary wagon-wheels, F, are mounted on an axle, G, the gage of these wheels being less than that of the wheels B and C. An inclined plane, H, inclined from the rear to the front of the vehicle, is fastened on the top of the axle G, this inclined plane being supported by a cushion, P, of rubber, or by suitable springs. The inclined plane H consists of two side plates connected by transverse rollers J along the inclined edge. A like inclined plane, K, inclined in the same direction as the plane H, and also provided with rollers J, rests upon the inclined plane H, the two inclined surfaces resting on each other. This inclined plane K is attached to the under side of the front of the vehicle. A pin, L, passes diagonally through the upper inclined plane, K, from the top of the vehicle-frame, as is shown in Figs. 1 and 3. The draft-bar M of the vehicle is attached to the axle G. Brake-shoes N, adjoining the wheels B, are pivoted to the vehicle-frame, and the chains of these brakes are attached to a brake-wrench, O, in the front part of the vehicle, or to any other devices for operating the brakes.

The operation is as follows: I will assume that the vehicle is supported by the rear wagon-wheels, B, and the front car-wheel, C, the inclined planes being in the position shown in full lines in Fig. 3. As the lower edge of the inclined plane H rests against the lower end of the pin L the inclined plane is locked in this position, and as the draft-bar M is attached to the axle G, the same and the inclined plane H will move forward in the direction of the arrow *a'*, and the inclined plane K and the vehicle will move with them; but if the vehicle is to be supported by the wheels B and F (in case it is to run over an ordinary road) the brakes N are applied and the pin L is withdrawn. The horses pull on the draft-bar M and the inclined plane H slides along the inclined plane K until the two inclined planes are in the position shown in dotted lines in Fig. 3, when the pin L is again inserted, and being to the rear of the inclined plane H locks it in the position shown in dotted lines; but by this movement of the inclined plane the wheels F have descended and the front of the vehicle has been raised, and consequently the wheels C, rigidly attached to the vehicle, have also been raised and the front end of the wagon is supported by the wheels F, as is shown in Figs. 1 and 2. If the front part of the vehicle is to be again supported by the wheels C, the brakes are applied, the pin L is withdrawn, and the horses are "backed," thus causing the inclined plane H to move in the inverse direction of the arrow $a'$, so that it will be in the position shown in full lines in Fig. 3, when the pin L is again inserted to lock the inclined plane in this position. By this movement of the inclined plane H the front end of the vehicle has been lowered and the wheels F have been raised, so that the front end of the vehicle is supported by the wheels C.

Having thus fully described my invention, I claim as new and desire to secure by Letters Patent—

1. A vehicle, constructed substantially as herein shown and described, with a pair of ordinary wagon-wheels in the rear, and with a pair of fixed flanged wheels and a pair of vertically-adjustable ordinary wagon-wheels in front, as set forth.

2. The combination, with the vehicle A, of the rear ordinary wagon-wheels, B, the front fixed flanged wheels, C, the ordinary wagon-wheels F, the inclined plane H on the axle of the wheels F, and the inclined plane K on the under side of the vehicle, and a coupling-pin N, or equivalent, substantially as herein shown and described, and for the purpose set forth.

3. The combination, with the vehicle A, of the rear ordinary wagon-wheels, B, of the fixed front flanged wheels, C, the wagon-wheels F, the axle G, the inclined planes H and K, the rollers J, and the pin L, or equivalent, substantially as herein shown and described, and for the purpose set forth.

The foregoing specification of my improvement in vehicles signed by me this 8th day of March, 1881.

JOSÉ DE CAUTERAC.

Witnesses:
RICARDO ORTEGA Y DIEZ,
CÁRLOS DE LOSSADA Y CAUTERAC.